(12) United States Patent
Liu et al.

(10) Patent No.: US 10,646,944 B2
(45) Date of Patent: May 12, 2020

(54) ELECTRIC IRON AND SOLDERING DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Feng Liu, Beijing (CN); Yuxi Dong, Beijing (CN); Quan Xia, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 309 days.

(21) Appl. No.: 15/822,833

(22) Filed: Nov. 27, 2017

(65) Prior Publication Data

US 2018/0281105 A1 Oct. 4, 2018

(30) Foreign Application Priority Data

Mar. 30, 2017 (CN) ...................... 2017 2 0325343 U

(51) Int. Cl.
*B23K 3/02* (2006.01)
*B23K 3/03* (2006.01)
*B08B 15/04* (2006.01)

(52) U.S. Cl.
CPC .............. *B23K 3/029* (2013.01); *B08B 15/04* (2013.01); *B23K 3/03* (2013.01)

(58) Field of Classification Search
CPC ......... B08B 15/04; B08B 15/00; B23K 3/029; B23K 3/08; B23K 3/03; B23K 3/0346; B23K 1/018; B23K 20/14; B23K 9/325
See application file for complete search history.

(56) References Cited

U.S. PATENT DOCUMENTS

| 2,041,018 | A | * | 5/1936 | Persons | B23K 3/029 228/20.5 |
| 2,184,980 | A | * | 12/1939 | Smith | B23K 3/029 228/20.5 |
| 2,955,187 | A | * | 10/1960 | Campo | B23K 1/018 228/20.5 |
| 3,383,023 | A | * | 5/1968 | Brewster | B23K 1/018 228/20.5 |
| 3,798,409 | A | * | 3/1974 | Troyer | B08B 15/04 219/137.41 |
| 4,358,662 | A | * | 11/1982 | Cranor | B23K 3/029 15/339 |
| 4,607,151 | A | * | 8/1986 | Kihlstrom | B23K 3/029 219/230 |
| 4,719,914 | A | * | 1/1988 | Johnson | A61B 18/082 604/35 |

(Continued)

FOREIGN PATENT DOCUMENTS

GB 2053761 A * 2/1981 ............. B08B 15/04

*Primary Examiner* — Patrick M. Buechner
(74) *Attorney, Agent, or Firm* — Foley & Lardner LLP

(57) ABSTRACT

An electric iron (1) includes a housing (11) and a handle (12) connected to the housing (11). The electric iron (1) further includes an exhaust hole (15) or a second exhaust pipe (18) disposed on the housing (11) and a first exhaust pipe (16) or a third exhaust pipe (19) disposed on the handle (12). A soldering device includes an air extractor (2) and the electric iron (1) as described above.

16 Claims, 2 Drawing Sheets

(56) References Cited

U.S. PATENT DOCUMENTS

| | | | | |
|---|---|---|---|---|
| D295,943 S | * | 5/1988 | Borley | B23K 3/029 D8/30 |
| 4,948,946 A | * | 8/1990 | Fukunaga | B08B 15/04 219/230 |
| 4,965,433 A | * | 10/1990 | Hanke | B23K 1/0004 219/230 |
| 5,080,277 A | * | 1/1992 | Diaconu | B23K 3/0338 219/230 |
| 5,182,435 A | * | 1/1993 | Wang | B23K 3/029 219/137.41 |
| 5,234,157 A | * | 8/1993 | Fletcher | B23K 3/085 219/227 |
| 5,497,963 A | * | 3/1996 | Lee | F16L 3/243 248/52 |
| 5,524,809 A | * | 6/1996 | Kosslow | B23K 3/0369 219/230 |
| 8,534,531 B1 | * | 9/2013 | Zhou | B23K 3/0338 219/229 |

\* cited by examiner

ELECTRIC IRON AND SOLDERING DEVICE

CROSS REFERENCE TO RELATED APPLICATIONS

The present application claims priority to Chinese Patent Application No. 201720325343.4 as filed on Mar. 30, 2017, the disclosure of which is incorporated herein in its entirety by reference.

TECHNICAL FIELD

The disclosure relates to an electric iron and a soldering device.

BACKGROUND

An electric iron is an indispensable tool for electronic manufacture and electrical maintenance, and its main usage is to solder elements and components and wires. It is an essential device in the process of circuit reconstruction. The electric iron will produce smog in the soldering process, in which, the main components of rosin in a solder tin wire are abietic acid anhydride, p-Coumaric Acid and resin hydrocarbons, and when the temperature reaches 250 degrees, a part of the oxides can be decomposed into carbon dioxide, sulfur dioxide, acetaldehyde, rosin acid, isocyanate, hydrocarbons, and the like. The smog has toxicity, and will seriously endanger people's health.

SUMMARY

The present disclosure provides an electric iron, including a housing and a handle connected to the housing, wherein the electric iron further includes a first gas conveying device disposed on the housing and a second gas conveying device disposed on the handle;

a first end of the first gas conveying device is connected to the second gas conveying device, smog produced during soldering is sucked in with aid of negative pressure at a second end of the first gas conveying device, and the smog is discharged by the second gas conveying device, the second end being an end far away from the first end.

Preferably, the housing and the handle are in the shape of a cylinder, and the electric iron further includes a cylinder-shaped iron core, a bottom of which is accommodated within the housing, and a head of which protrudes from the housing.

Preferably, the first gas conveying device is an exhaust hole, and the exhaust hole is arranged within a sidewall of the housing, and runs through the sidewall of the housing along an axial direction of the housing.

Preferably, the second gas conveying device is a first exhaust pipe, and is disposed inside the handle.

Preferably, the first exhaust pipe includes a first exhaust manifold and first exhaust branch pipes, the number of the first exhaust branch pipes is the same as the number of exhaust holes, and an end of each of the first exhaust branch pipes is connected to a corresponding exhaust hole, another end of each of the first exhaust branch pipes is connected to the first exhaust manifold, the first exhaust manifold extending to outside of the handle.

Preferably, the first exhaust manifold and the first exhaust branch pipes are hoses, and each of the first exhaust branch pipes plugs in a corresponding exhaust hole.

Preferably, the handle and the sidewall of the housing are threaded-connected.

Preferably, there are multiple ones of the exhaust hole distributed uniformly around the periphery of the housing.

Preferably, there are 2-8 exhaust holes.

Preferably, the first gas conveying device is a second exhaust pipe, the second exhaust pipe is positioned on an outer side of the sidewall of the housing along an axial direction of the housing, and a length of the second exhaust pipe is equal to a length of the housing.

Preferably, the second gas conveying device is a third exhaust pipe, and the third exhaust pipe is positioned on an outer side of the handle along an axial direction of the handle.

Preferably, the third exhaust pipe includes a third exhaust manifold and third exhaust branch pipes, the number of the third exhaust branch pipes is the same as the number of the second exhaust pipe and one or more other second exhaust pipe, and an end of each of the third exhaust branch pipes is connected to a corresponding second exhaust pipe, and another end of each of the third exhaust branch pipes is connected to the third exhaust manifold.

Preferably, there are multiple ones of the second exhaust pipe distributed uniformly around a periphery of the housing.

Preferably, there are 2-8 second exhaust pipes.

Furthermore, the electric iron further includes a heat insulating layer, which is arranged between the iron core and the sidewall of the housing.

The present disclosure further provides a soldering device, including an air extractor and the electric iron as stated above, the air extractor being connected to an end of the second gas conveying device not connected to the first gas conveying device.

DETAILED DESCRIPTION

In order to make those skilled in the art better understand the technical solution of the present disclosure, hereinafter, the present disclosure will be further described in detail in conjunction with the accompanied drawings and specific embodiments.

The toxic smog produced during the soldering cannot be treated with an existing electric iron, and can only be brought to spread into the working space, and an air extractor is arranged within the working space. On the air extractor, there is provided a trumpet-shaped air suction device, and the smog in the working space is sucked in and discharged to the outside of the working space with the air suction device of the air extractor. However, the air extractor is situated at a farther distance from the electric iron, and the smog produced during the soldering will still spread into the air firstly, and then is discharged by the air extractor. Since the air extractors are usually distributed over everywhere within the working space, and it is very difficult to control the distance between them and the operator, and so, it is difficult to ensure the effect of discharging the smog everywhere within the working space. In addition, the operator holds the electric iron in his hand to carry on the soldering operation, and a part of the smog will still be directly inhaled by the operator, and thus the effect of discharging the smog is not good.

Therefore, an electric iron and a soldering device are urgently needed to solve the above problems.

Regarding the above defects which exist in the prior art, the present disclosure provides an electric iron and a soldering device, for partially solving the problem that the effect of discharging the smog produced during the soldering is not good.

The present disclosure has the following beneficial effects:

With regard to the electric iron and the soldering device provided by the present disclosure, by providing the first gas conveying device on the housing of the electric iron and providing the second gas conveying device connected to the first gas conveying device on the handle, it is possible to utilize negative pressure within the first gas conveying device and the second gas conveying device to suck in the smog produced during soldering at an end of the first gas conveying device far away from the second gas conveying device, and to discharge the smog from the second gas conveying device. In this way, the smog produced during soldering is aspirated into the inside of the electric iron and is discharged from the working space before it spread into the air, and thus damage of the smog to the operator is decreased to the utmost extent. Furthermore, with the electric iron and the soldering device provided by the present disclosure, collection and treatment are carried on from the source of generating the smog, and an issue that the effect of discharging the smog varies from place to place within the working space can be solved.

Figure 1:
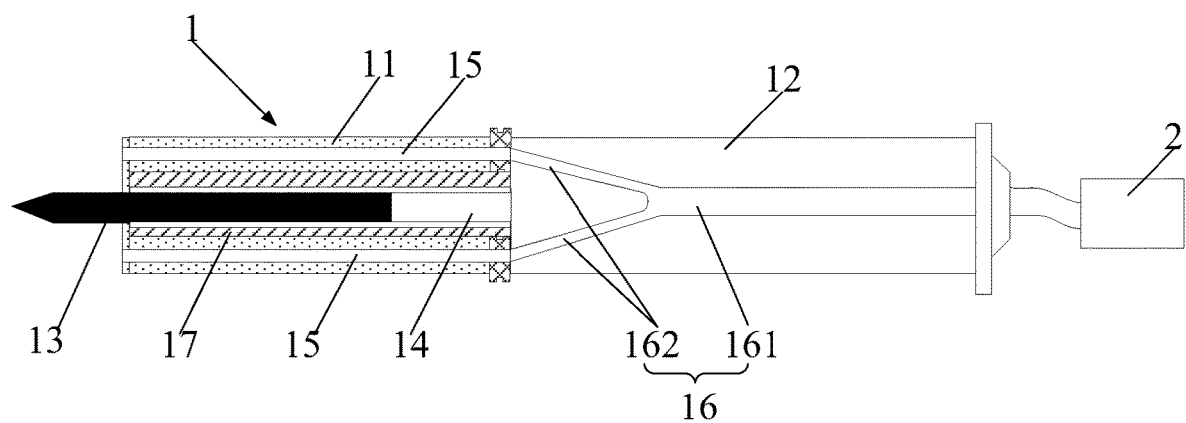
FIG. 1 is an overall structural view illustrating a soldering device provided by the present disclosure.
Figure 2:
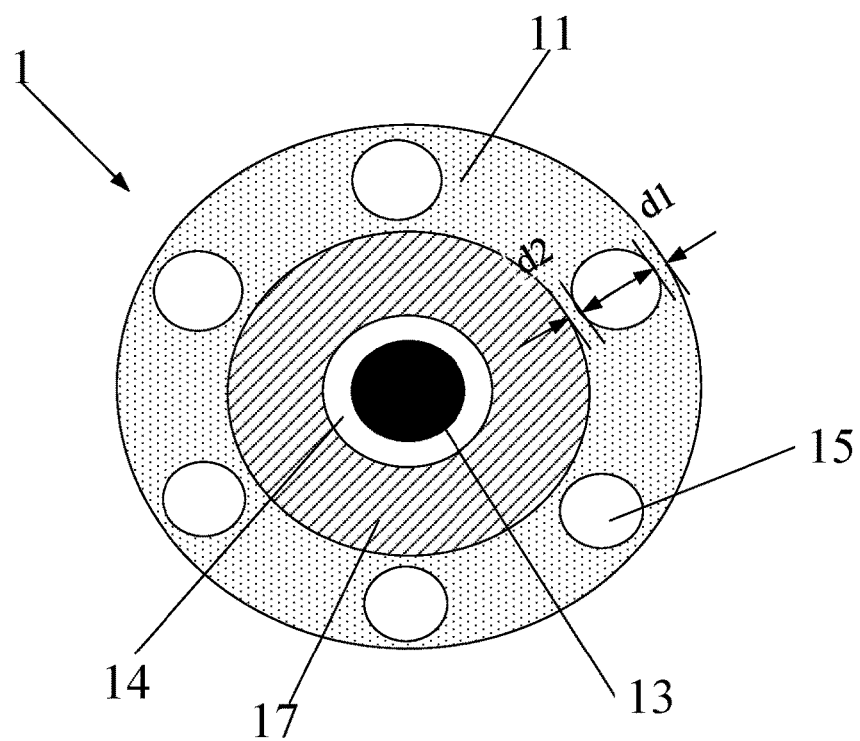
FIG. 2 is a schematically sectional view illustrating an electric iron provided by the present disclosure.

In combination with those shown in FIG. 1 and FIG. 2, the present disclosure provides an electric iron 1 that includes a housing 11, a handle 12 and an iron core 13, each of which is in the shape of a cylinder. The handle 12 is connected to the housing 11, a bottom of the iron core 13 is accommodated within the housing 11, and a head of the iron core 13 protrudes from the housing 11. The electric iron 1 further includes a first gas conveying device disposed on the housing 11 and a second gas conveying device disposed on the handle 12. The first gas conveying device includes a first end, which is connected to the second gas conveying device, and a second end, which is an end far away from the first end, namely, an end that is adjacent to the iron core 13. At the second end of the first gas conveying device, the smog produced during soldering can be sucked in with aid of negative pressure, and the smog is discharged by the second gas conveying device.

In combination with those shown in FIG. 1 and FIG. 2, the electric iron 1 further includes an iron head 14. It is noted that, the electric iron 1 is classified into two types, i.e., an externally heated type and an internally heated type. The iron head of the externally heated type of the electric iron is installed inside the iron core, and the iron core of the internally heated type of the electric iron is installed inside the iron head. The present disclosure will be illustrated with the internally heated type of the electric iron as an example.

In combination of those shown in FIG. 1 and FIG. 2, the iron core 13 is accommodated within the iron head 14, and the iron head 14 is accommodated within the housing 11.

The electric iron 1 operates in such a way that the iron core 13 is heated by energization. In order to avoid the damage of the housing 11 by the high-temperature iron core 13, between the iron core 13 and a sidewall of the housing 11, there is further arranged a heat insulating layer 17, which is used for preventing transmission of heat from the iron core 13 at a higher temperature to the housing 11 at a lower temperature.

As for the internally heated type of the electric iron, the heat insulating layer 17 is disposed between the iron head 14 and the sidewall of the housing 11. As for the externally heated type of the electric iron, the heat insulating layer is disposed between the iron core and the sidewall of the housing.

By providing the first gas conveying device on the housing 11 of the electric iron 1 and providing the second gas conveying device connected to the first gas conveying device on the handle 12, it is possible to utilize negative pressure within the first gas conveying device and the second gas conveying device to suck in the smog produced during soldering at an end of the first gas conveying device far away from the second gas conveying device, and to discharge the smog. In this way, the smog produced during soldering is aspirated into the inside of the electric iron 1 and discharged from the working space before it spread into the air, and thus damage of the smog to the operator is decreased to the utmost extent. Furthermore, with the electric iron 1 provided by the present disclosure, collection and treatment can be carried on from the source of generating the smog, and an issue that the effect of discharging the smog varies from place to place within the working space can be solved.

Preferably, as shown in FIG. 1, the first gas conveying device may be, for example, an exhaust hole 15, which is disposed within the sidewall of the housing 11, a diameter of the exhaust hole 15 is smaller than thickness of the sidewall of the housing 11, and the exhaust hole 15 runs through the housing 11 along an axial direction of the housing 11. That is, the exhaust hole 15 is arranged in the same direction as the housing 11, and an end of the exhaust hole 15 far away from the second gas conveying device is communicated with the air.

Preferably, the exhaust hole 15 is arranged in the middle of the sidewall of the housing 11, namely, a distance d1 between the exhaust hole 15 and an external sidewall of the housing 11 is equal to a distance d2 between the exhaust hole 15 and an internal sidewall of the housing 11.

The size of the exhaust hole 15 cannot be too large, otherwise, the sidewall 11 of the housing at the corresponding position of the exhaust hole 15 is thinner, and the housing 11 breaks easily, thereby affecting service life of the electric iron 1. While in the case that the size of the exhaust hole 15 is too small, the discharging effect will be affected as well. Therefore, in order to give consideration to both the strength of the housing 11 and the discharging effect of the smog, preferably, the difference between the maximum thickness of the sidewall of the housing 11 and the diameter of the exhaust hole 15, (d1+d2), is 5 mm. It is noted that, the value of (d1+d2) needs to be determined by the substance and the hardness of the housing 11. If the housing 11 is of soft rubber substance, the thickness of the sidewall needs to be increased relatively, namely, the value of (d1+d2) needs to be bigger, so as to ensure that after the housing 11 is pinched flat during its use, normal gas suction of the second gas conveying device will not be affected. If the housing 11 is of hard engineering plastic, the value of (d1+d2) can be smaller relatively.

Preferably, as shown in FIG. 2, there are a plurality of the exhaust holes 15, and they are distributed uniformly around the periphery of the housing 11.

Preferably, there may be 2-8 exhaust holes 15. In the embodiment of the present disclosure, taking account of the fact that the electric iron 1 belongs to a small-sized soldering device, and owing to the constraint of the diameter of the housing 11, there are 6 exhaust holes 15.

As shown in FIG. 1, the second gas conveying device may be, for example, a first exhaust pipe 16, and the first exhaust pipe 16 is connected to the exhaust hole 15.

For example, the first exhaust pipe 16 includes a first exhaust manifold 161 and first exhaust branch pipes 162, and the number of the first exhaust branch pipes 162 is the same as the number of the exhaust holes 15. Moreover, one end of the first exhaust branch pipe 162 is connected to a corresponding exhaust hole 15, and the other end of the first exhaust branch pipe 162 is connected to the first exhaust manifold 161, the first exhaust manifold 161 extending to the outside of the handle 12. That is to say, each of the first exhaust branch pipes 162 corresponds to each of the exhaust holes 15 on a one-to-one basis, and each of the exhaust holes 15 is connected to a corresponding first exhaust branch pipe 162, respectively.

As shown in FIG. 1, an end of the first exhaust manifold 161 not connected to the exhaust holes 15 may be connected to an air extractor 2. The smog produced during soldering enters the exhaust holes 15, respectively, then enters the first exhaust branch pipes 162, and afterwards, converges into the first exhaust manifold 161, and finally, the smog is discharged through the first exhaust manifold 161, and enters the air extractor 2.

Preferably, the first exhaust manifolds 161 and the first exhaust branch pipes 162 are hoses, and the first exhaust branch pipes 162 plug into the corresponding exhaust holes 15, namely, the first exhaust branch pipes 162 are inserted into the exhaust holes 15.

The length of that section of the first exhaust manifold 161 located outside the handle 12 may be set to be 1-2 m. Generally, the air extractor 2 is fixedly installed within the working space, for example, it is arranged on a rooftop or a wall of a workshop, a plant or a laboratory, and in the case that a hose is used as the first exhaust pipe 16, it is convenient for the operator to move within a small area (the region with a radius of 1-2 m). It is more convenient for use.

In the case that power of the air extractor 2 is constant, the discharging effect is related to distance between an end of the exhaust holes 15 adjacent to the iron core 13 and the air extractor 2. The greater the distance is, the less the discharging efficiency and the discharging effect are; the smaller the distance is, the better the discharging efficiency and the discharging effect are. As a result, for the sake of adjusting the effect of discharging the smog based on actual situation, the distance between the housing 11 and the handle 12 can be adjusted.

The handle 12 and a sidewall of the housing 11 may be threaded connected, for example, an external thread may be disposed on an external sidewall of an end of the housing 11 (i.e., the end connected to the handle 12), and an internal thread may be disposed at an end of the handle 12 (i.e., the end connected to the housing 11). By adjusting the thread screw-in distance between the handle 12 and the sidewall of the housing 11, the distance between an end of the housing 11 adjacent to the iron core 13 (i.e., a soldering end) and the handle 12 can be adjusted, and thus the distance between an end of the exhaust holes 15 adjacent to the iron core 13 and the air extractor 2 is adjusted accordingly.

It is noted that, an extendable pipe may be further chosen as the first exhaust pipe 16, and in this way, the length of the first exhaust pipe 16 can be further adjusted. Thus, the distance between an end of an exhaust hole 15 adjacent to the iron core 13 and the air extractor 2 is adjusted.

In another embodiment of the present disclosure, a first gas conveying device is positioned on an outer side of the housing 11, and a second gas conveying device is positioned on an outer side of the handle 12.

Figure 3:
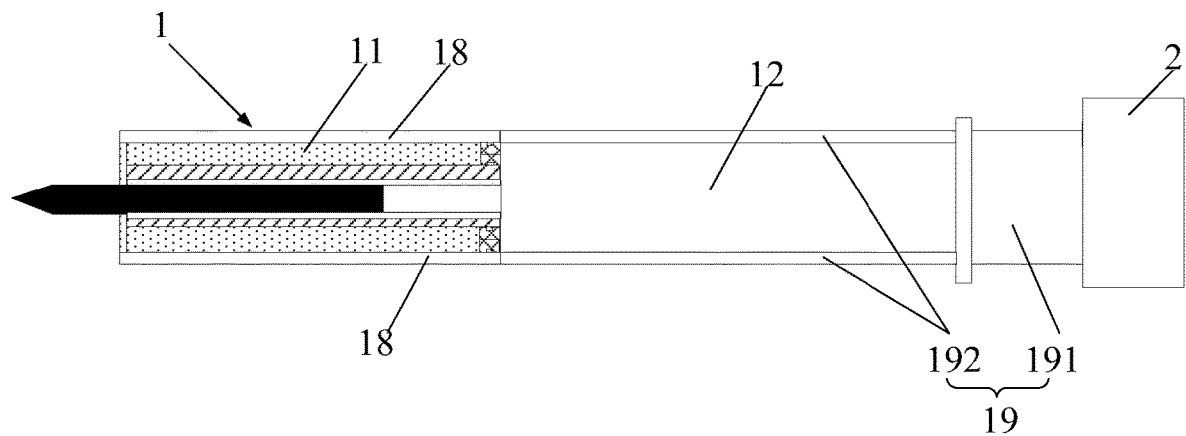
FIG. 3 is an overall structural view illustrating another soldering device provided by the present disclosure.
Figure 4:
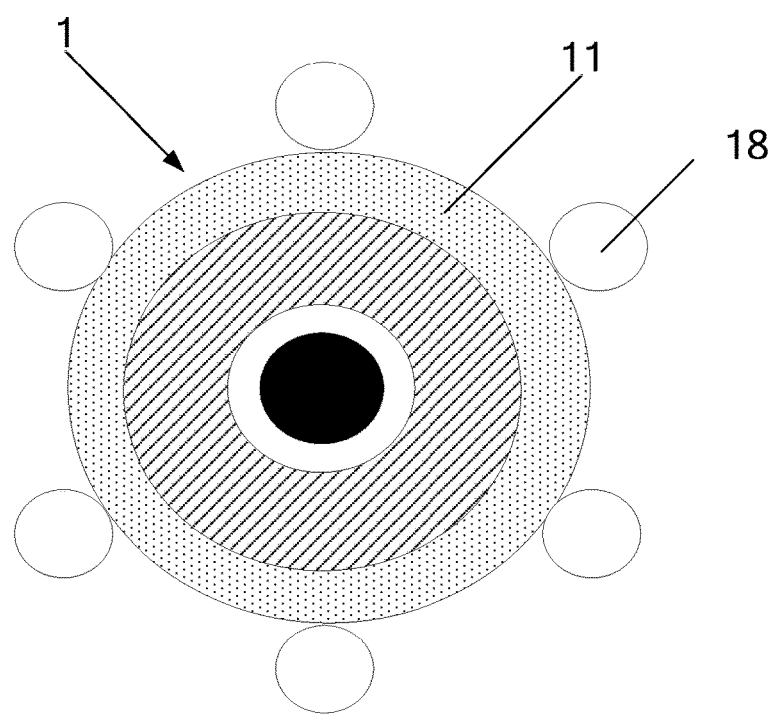
FIG. 4 is a schematically sectional view illustrating another electric iron provided by the present disclosure.

As shown in FIG. 3 and FIG. 4, the first gas conveying device may be, for example, a second exhaust pipe 18, the second exhaust pipe 18 is located on an outer side of a sidewall of the housing 11 along an axial direction of the housing 11, and the length of the second exhaust pipe 18 is equal to the length of the housing 11.

The second gas conveying device may be, for example, a third exhaust pipe 19, and is located on an outer side of the handle 12 along an axial direction of the handle 12. The third exhaust pipe 19 includes a third exhaust manifold 191 and third exhaust branch pipes 192. The number of the third exhaust branch pipes 192 is the same as the number of the second exhaust pipes 18, and moreover, one end of a third exhaust branch pipe 192 is connected to a corresponding second exhaust pipe 18, and the other end of the third exhaust branch pipe 192 is connected to the third exhaust manifold 191.

Preferably, there are a plurality of the second exhaust pipes 18, and they are distributed uniformly around the periphery of the housing 11.

Preferably, there are 2-8 second exhaust pipes 18.

Other components and connection relationship of the electric iron 1 as shown in FIG. 3 and FIG. 4 are the same as components and connection relationship of the electric iron 1 as shown in FIG. 1 and FIG. 2, and details are omitted here.

The present disclosure further provides a soldering device, which includes an air extractor 2 and an electric iron 1. The aforesaid electric iron is used as the electric iron 1, and its structure is not described here any longer. The air extractor 2 is connected to an end of the second gas conveying device (i.e., the exhaust pipes 16 in the present disclosure) that is not connected to the first gas conveying device (i.e., the exhaust holes 15 in the present disclosure).

By providing the first gas conveying device on the housing 11 of the electric iron 1 and providing the second gas conveying device connected to the first gas conveying device on the handle 12, it is possible to utilize negative pressure within the first gas conveying device and the second gas conveying device to suck in the smog produced during soldering at an end of the first gas conveying device far away from the second gas conveying device, and to discharge the smog. In this way, the smog produced during soldering is aspirated into the electric iron 1 and is discharged from the working space before it spreads into the air, and thus damage of the smog to the operator is decreased to the utmost extent. Furthermore, with the electric iron 1 provided by the present disclosure, collection and treatment can be carried on from the source of generating the smog, an issue that the effect of discharging the smog varies from place to place within the working space can be solved.

According to the present disclosure, by arranging the first gas conveying device and the second gas conveying device on the housing 11 and the handle 12 of the electric iron, respectively, the soldering smog is extracted in vacuum, and thus the function of efficiently discharging the soldering smog is achieved. Thereby, damage of the smog caused by soldering to the human body is reduced substantially.

According to the present disclosure, a vacuum tube is combined with a soldering electric iron, so as to achieve discharging effects of intensiveness, convenience and high efficiency. When smoke and dust are produced by the electric iron 1, the smog can be extracted and discharged, so that diffusion of the smog is reduced, and further, the operator's health is protected. It is predicted that the extracted toxic smog can reach more than ninety-five percent. With the electric iron and the soldering device according to the present disclosure, it is not necessary to manually adjust the air extractor any more, and the steps of soldering operation are optimized. According to the present disclosure, a trumpet-shaped air suction device on each air extractor in the working space can also be omitted, and utilization ratio of an operating desk is optimized. Thus, the working space after intensiveness is improved.

It can be understood that, the foregoing embodiments are merely exemplary embodiments used to explain the principle of the present disclosure, but the present disclosure is not limited thereto. For those skilled in the art, various variances and modifications can be made without departing from the spirit and essence of the present disclosure. As such, these variances and modifications are deemed as falling within the protective scope of the present disclosure.

What is claimed is:

1. An electric iron, including a housing and a handle connected to the housing, wherein the electric iron further includes an exhaust hole or a second exhaust pipe disposed on the housing and a first exhaust pipe or a third exhaust pipe disposed on the handle;
a first end of the exhaust hole or the second exhaust pipe is connected to the first exhaust pipe or the third exhaust pipe, smog produced during soldering is capable of being sucked in with aid of negative pressure at a second end of the exhaust hole or the second exhaust pipe, and the smog is discharged by the first exhaust pipe or the third exhaust pipe, the second end being another end opposite to the first end.

2. A soldering device, including an air extractor and the electric iron of claim 1, the air extractor being connected to an end of the first exhaust pipe or the third exhaust pipe not connected to the exhaust hole or the second exhaust pipe.

3. The electric iron of claim 1, wherein the housing and the handle are in the shape of a cylinder, and the electric iron further includes a cylinder-shaped iron core, a bottom of which is accommodated within the housing, and a head of which protrudes from the housing.

4. The electric iron of claim 3, wherein the second exhaust pipe is positioned on an outer side of the sidewall of the housing along an axial direction of the housing, and a length of the second exhaust pipe is equal to a length of the housing.

5. The electric iron of claim 4, wherein the third exhaust pipe is positioned on an outer side of the handle along an axial direction of the handle.

6. The electric iron of claim 5, wherein the third exhaust pipe includes a third exhaust manifold and third exhaust branch pipes, the number of the third exhaust branch pipes is the same as the number of one or more other second exhaust pipe, and an end of each of the third exhaust branch pipes is connected to a corresponding one of the one or more other second exhaust pipe, and another end of each of the third exhaust branch pipes is connected to the third exhaust manifold.

7. The electric iron of claim 4, wherein there are multiple ones of the second exhaust pipe distributed uniformly around a periphery of the housing.

8. The electric iron of claim 7, wherein there are 2-8 second exhaust pipes.

9. The electric iron of claim 3, wherein the exhaust hole is arranged within a sidewall of the housing, and runs through the sidewall of the housing along an axial direction of the housing.

10. The electric iron of claim 9, wherein the electric iron further includes a heat insulating layer, which is arranged between the iron core and the sidewall of the housing.

11. The electric iron of claim 9, wherein there are multiple ones of the exhaust hole distributed uniformly around the periphery of the housing.

12. The electric iron of claim 11, wherein there are 2-8 exhaust holes.

13. The electric iron of claim 9, wherein the first exhaust pipe is disposed inside the handle.

14. The electric iron of claim 13, wherein the first exhaust pipe includes a first exhaust manifold and first exhaust branch pipes, the number of the first exhaust branch pipes is the same as the number of exhaust holes, and an end of each of the first exhaust branch pipes is connected to a corresponding exhaust hole, another end of each of the first exhaust branch pipes is connected to the first exhaust manifold, the first exhaust manifold extending to outside of the handle.

15. The electric iron of claim 14, wherein the first exhaust manifold and the first exhaust branch pipes are hoses, and each of the first exhaust branch pipes plugs in a corresponding exhaust hole.

16. The electric iron of claim 15, wherein the handle and the sidewall of the housing are threaded-connected.

* * * * *